(12) United States Patent
Tuli

(10) Patent No.: US 9,794,516 B1
(45) Date of Patent: Oct. 17, 2017

(54) TELEPRESENCE SYSTEM

(71) Applicant: Raja Singh Tuli, Montreal (CA)

(72) Inventor: Raja Singh Tuli, Montreal (CA)

(*) Notice: Subject to any disclaimer, the term of this patent is extended or adjusted under 35 U.S.C. 154(b) by 0 days.

(21) Appl. No.: 15/352,783

(22) Filed: Nov. 16, 2016

(51) Int. Cl.
H04N 7/15 (2006.01)
H04N 7/14 (2006.01)
H04N 5/44 (2011.01)

(52) U.S. Cl.
CPC .......... *H04N 7/15* (2013.01); *H04N 5/4403* (2013.01); *H04N 7/144* (2013.01); *H04N 2005/4432* (2013.01)

(58) Field of Classification Search
None
See application file for complete search history.

(56) References Cited

U.S. PATENT DOCUMENTS

| | | | |
|---|---|---|---|
| 6,784,916 B2 | 8/2004 | Smith | |
| 6,879,879 B2 | 4/2005 | Jouppi | |
| 6,889,120 B2 | 5/2005 | Jouppi | |
| 7,593,546 B2* | 9/2009 | Jouppi | H04N 7/144 348/211.12 |
| 8,717,447 B2 | 5/2014 | Shuster | |
| 8,994,776 B2 | 3/2015 | Sutherland | |
| 9,014,848 B2 | 4/2015 | Farlow | |
| 9,332,219 B2 | 5/2016 | Kwon | |
| 2004/0117067 A1 | 6/2004 | Jouppi | |
| 2014/0362170 A1 | 12/2014 | Walker | |
| 2015/0249805 A1* | 9/2015 | White | H04N 7/144 348/14.16 |
| 2015/0332090 A1* | 11/2015 | Kumamoto | G06K 9/00912 348/222.1 |
| 2016/0078279 A1* | 3/2016 | Pitre | A61B 5/7264 382/118 |
| 2017/0061955 A1* | 3/2017 | Gueta | G10L 13/04 |

OTHER PUBLICATIONS

Norman P. Jouppi and Stan Thomas, "Telepresence Systems With Automatic Preservation of User Head Height Local Rotation, and RemoteTranslation", Conference Paper—Jan. 2005 DOI: 10.1109/ROBOT.2005.1570097 •Source: DBLP.

(Continued)

*Primary Examiner* — Creighton Smith

(57) ABSTRACT

A system for telepresencing is provided with a user station at a remote user's location and a telepresence device at a local subject's location. Distance of objects around the local subject is sensed such that a selected distance between the telepresence device and the local subject is maintained. Eye features and gazes of the local subject and the remote user are sensed. The height of the telepresence device's display is adjusted automatically such that the eye level of the local subject matches with the eye level of the user's image in the display. When an intended eye contact is sensed, positions of the telepresence device, its display and a sensor hub that houses cameras and other sensors are adjusted, and a face image may be recreated at a different viewing angle to resemble an eye contact between the local subject and the remote user while preserving all other facial expressions.

20 Claims, 2 Drawing Sheets

(56) References Cited

OTHER PUBLICATIONS

Irene Rae, Leila Takayama and Bilge Mutlu, "The influence of height in robot-mediated communication", HRI 2013 Proceedings of the 8th ACM/IEEE international conference on Human-robot interaction, pp. 1-8, Tokyo, Japan, Mar. 3-6, 2013.

Annica Kristoffersson, Silvia Coradeschi, and Amy Loutifi, "A Review of Mobile Robotic Telepresence", Hindawi Publishing Corporation, Advances in Human-Computer Interaction, vol. 2013, Article ID 902316, 17 pages http://dx.doi.org/10.1155/2013/902316 (2013).

* cited by examiner

TELEPRESENCE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND

Field of the Invention

The present invention relates generally to videoconferencing and more specifically to a telepresence system with specific features such as automatic matching the height of the telepresence device's display to a local subject, maintaining a selected distance with the local subject, recognising gaze direction and matching eye contact between a remote user and the local subject.

Description of Related Art

Driven by globalization of business organizations and decentralization of workforce, demands of video conferencing services and equipment are in rapid expansion in multinational corporate enterprises. In recent years, video conferencing has become widely adopted by public sectors and healthcare sectors as an effective form of communication between remote users. However, messages delivered by video conferencing is not as effectively as it is in a face-to-face conversation, particularly in a sense that subtle non-verbal communication cues such as eye contact, eye gaze and interpersonal distance, are often overlooked or impossible to be replicated in video conferencing. By contrast, people engaged in a face-to-face conversation tend to frequently keep an eye contact with others within an interpersonal distance.

In most video conferencing systems and telepresence systems, cameras or image sensors, which capture an image of the interacting subject, are often located above or at the periphery of the monitor, which displays an image of the remote user. It is evident that even a user is intended to look into the eyes of an interacting subject's image in the monitor will appeared to be looking down in the interacting subject's perspective when the camera is placed atop the monitor. Similarly, the user will appear to be gazing to a side when the camera is placed on the side of the monitor, or will appear to be looking up when the camera is placed below the monitor. As a result of this camera orientation issue, the user's gaze direction shown in the subject's monitor will appeared different from his actual intention. However, adjustments on the images are often neglected in these systems. These systems, therefore, are insufficient for preserving gaze direction or maintaining eye contact between users.

Telepresence robotic system remains one of the most realistic two-way interactive video conferencing available on the market hitherto because it overcomes physical distance while assists to create a sense of presence of a remote user to enable social communication. Advancements have been made to improve the interaction between users, particularly, to permit eye contact between the user and the interacting subject via a telepresence device. Proposed methodologies in these advancements include manoeuvring the head of the telepresence device to face the direction of a user's voice, and using a semi-silvered mirror or a beamsplitter panel that allows mounting a camera directly behind to provide an apparent eye contact between the user's image and the interactive subject. Another teaching reveals a telepresence system that relies on a projected life size image of the surrogate's location to preserve the user perspective and a vertical gaze. Another teaching uses 3D reconstruction technique to re-center both the head and the eye position of the user's image in the telepresence device display.

However, these telepresence systems have their limitations in terms of ease of use, affordability and overall user experience. For example, there is a need of heavy computation and networking resources to render and transmit the high resolution life size background image, the user's intended gaze direction is not truly preserved and there are inherent issues of beamsplitter, such as degraded image quality by ambient light and bulkiness of the setup that restricts the mobility of a user to a specific physical location where the beamsplitter is installed beforehand.

More recently, a telepresence robotic (E-Travel) system has been developed that duplicates the height of a remote user in a surrogate robot and preserves the remote user's perspective and vertical gaze. In another approach, a telepresence device equipped with haptic feedback is configured to move in response to a force exerted by a local subject. However, none of these systems show capability of automatically matching the robot's height with the local subject or continuously maintaining a selected distance between the robot and the local subject in response to the real-time movement of the subject.

Behaviour scientists have shown that having a commonly accepted interpersonal distance according to various circumstances and maintaining constant eye contact have major impacts on social interaction. A lack of these interactions may create a perception of disinterest or preoccupation that made one feel disconnected from the conversation, or may lower the attention spans among the participants and may made difficult for the remote user to maintain a sense of presence at the same physical location as the interacting subject. Furthermore, researches have shown that person who is video conferencing and is presented as eye contact avoidant, due to the camera parallax error, will be perceived negatively. Results have also shown that people prefer interacting with devices of their similar height and tend to be staying closer to the telepresence device when they are about the same height.

Accordingly, in order to have a better sense of personal contact and to reinforce the presence of the remote user, there is a need in the art for a method or a system that specifically preserve the intended eye gaze of both users while capable of responding to the physical movement of the subject in real-time, such that the telepresence device automatically maintains a selected distance with the local subject and matches with the subject's height.

BRIEF SUMMARY OF THE INVENTION

The present invention relates to a system that enhances the quality of interaction and the effectiveness of communication between one and the others who are separated by distance. Specifically, it discloses a telepresence system having features of automatically matching the eye level of a remote user's image displayed in a telepresence device with the eye level of a local subject, maintaining a selected distance between the telepresence device and the local subject, recognizing gaze direction and maintaining eye contact between the interacting local subject and the remote user when an intention of maintaining eye contact is detected, in minimum human intervention.

Details of one or more implementations of the disclosure are set forth in the accompanying drawings and the description below. Other aspects, features, and advantages will be apparent to those skilled in the art from reading of the following description and drawings, and from the claims.

BRIEF DESCRIPTION OF THE DRAWINGS

This invention will be better appreciated from a consideration of the detailed description of non-limiting embodiments presented hereinbelow with reference to the accompanying drawings, in which.

DETAILED DESCRIPTION OF THE INVENTION

Figure 1:
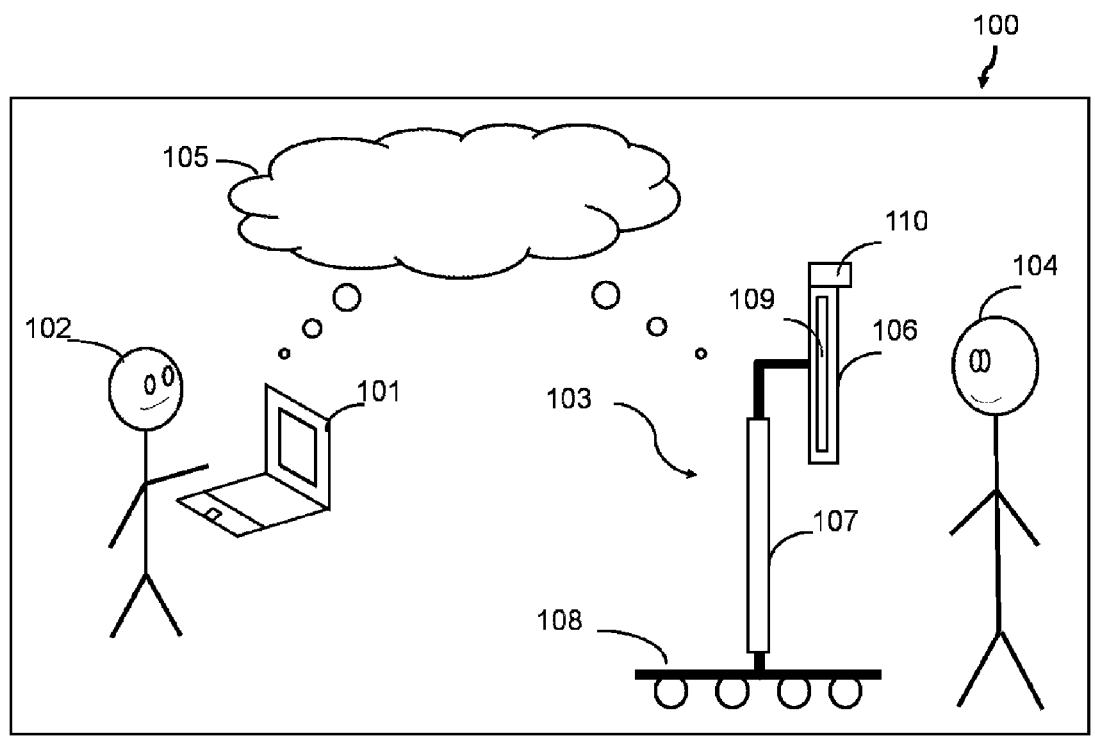
FIG. 1 is an illustration of the preferred embodiment of the telepresence system in this invention

Referring to FIG. 1, therein is shown a telepresence system 100 in accordance with the present invention, which can be used to conduct a remote visit. In a preferred embodiment, a telepresence system has a user station 101 in the form of a computer or a head-mounted display (HIVID) equipped with camera(s), speaker(s) and microphone(s) at a first geographic location with a remote user 102, and a telepresence device 103 at a second geographic location with a local subject 104.

The telepresence device 103 described herein includes a liquid crystal display (LCD) panel 106 to display the full frontal face image of the user 102. The display 106 is mounted and supported by a series of motorized components 107 so that it can be move up and down to cover a wide range of height ranging from a seated short person to a standing tall person, as well as to translate, tilt and rotate the display 106 to a desired spatial position that faces directly to the local subject 104.

The supporting and mounting components 107 are connected to a motorized mobile platform 108 that includes a series of wheels and motor to allow the telepresence device 103 to maneuver through a site without tipping. The motorized mobile platform 108 also houses the batteries and a control computer with computer network connection. The motorized mobile platform 108 may be electronically controlled such that the telepresence device 103 is responsive to the subject's position and to the commands from the user station 101 remotely connected via a wireless communication network 105. Or, the motorized mobile platform 108 may be manually operable such that the telepresence device 103 can be manually moved around at the subject's site by a person. In any case, the telepresence device 103 automatically maintains a selected distance with the subject 104 to reproduce a usual social distance (e.g. 1.5 m-3 m) as if the remote user 102 and the local subject 104 are in the same location.

One or more speakers 109 are positioned on the left and right sides of the display 106 to provide directional audio of the user's voice. Meanwhile, signals of audio and video are transmitted between the user station 101 and the telepresence device 103 via a high-speed communication network 105 as images and sounds are continuously acquired via the microphone and cameras in the sensors hub 110 positioned on top of the display 106 and those equipped in the user station 101, respectively.

Figure 2:
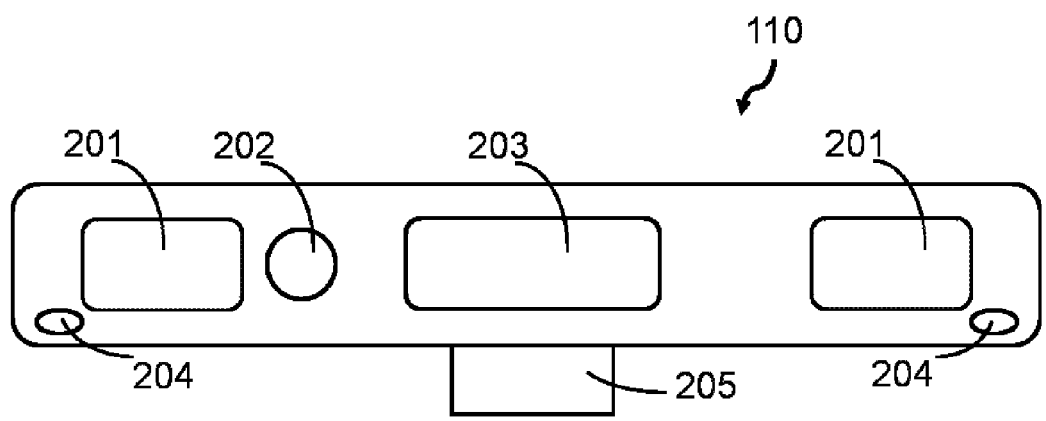
FIG. 2 is an illustration of the sensors hub in the telepresence device

Referring now to FIG. 2, therein is shown the sensors hub 110 of the telepresence device 103 in accordance with the present invention. The sensors hub 110 comprises infrared sensors 201, an infrared emitter 202, one or more high resolution 3D cameras 203 and two microphones 204 located at the bottom front corners of the hub to receive audio of the subject 104. Other sensors, detectors or means in the art can be incorporated into this sensors hub when needed. The sensor hub 110 can be tilted, extend out and rotate independently from the display 106 by a motorized directional control means 205, which may be electronically controlled such that the positions of the sensors are responsive to the eye position or to the physical movement of the subject 104.

In order to recognize the gaze of the subject, one or more infrared sensors 201 are combined with the infrared emitter 202 to track the eye movement of the local subject 104. The infrared emitter 202 projects an infrared pattern on the subject's eyes and the infrared sensor 201, which may be an infrared camera in this case, capture a high-frame-rate image of the user's eyes showing these reflections. Images are processed by computer-implemented algorithms to calculate the subject's eyes position and the gaze point on the display 106. It should be noted that this embodiment is merely an example of a feasible way of eye tracking and gaze recognizing. Meanwhile, there are many other ways exist in the art to obtain the same information.

When one of the infrared sensors 201 is a depth sensing camera, a depth image is captured. Together with the 3D color image captured by the 3D camera 203, geometrical relationships of objects around the subject 104 and the telepresence device 103 that fall within the field of view of the cameras may be extracted by computer-implemented algorithms. Processed information may be used to control the distance between the telepresence device 103 and the subject 104, and to avoid potential obstacles when the telepresence device 103 is commanded by the remote user 102 to maneuver around the site. Again, it should be noted that other feasible embodiments exist in the art to acquire the same information.

Although the components in FIG. 2 are illustrated as being attached as a whole unit on top of the display 106, this is merely an example, and thus each of the components can be mounted separately from others and onto various locations of the telepresence device 103.

Key components of the present invention comprise matching eye contact and preserving gaze direction between the user's face image displayed on the telepresence device display 106 and the interacting subject 104. Gaze direction relates to where a person is looking at and eye contact relates to the act of looking directly into another's eye. Both characteristics provide subtle and essential information over and above spoken words that enhance the overall user experiences of virtual meeting.

To enable a natural eye contact experience in the subject location, it is essential to match the height of the local subject 104 with the telepresence device 103 throughout the entire virtual meeting. More precisely, that is to match the eye level of the subject 104 with the eye level of the user's image displayed in the display 106 of the telepresence device 103.

In one embodiment out of many feasible alternatives in the art, a real-time 3D image of the subject's face is captured by the camera 203 in order to match the height of the subject 104 with the telepresence device 103. Information of distinctive facial features from the image, such as eye iris and pupil, are extracted and analyzed by pattern recognition software in the telepresence device's control computer. The eye features are then identified and their positions are also determined from the information acquired by the infrared sensor 201 or by an infrared camera. The control computer in the telepresence device 103 then automatically raises or lowers the supporting components 107 so that the eye level of the user's face displayed in the telepresence device's display 106 matches exactly with the eye level of the subject 104 automatically. The height of the subject 104 is continuously monitored by the infrared sensors 201 or by an infrared camera, information received are then analyzed by a pattern recognizing software to instantaneously adjust the height of the telepresence device 103. Therefore, in case the subject's eye level changes during a meeting, e.g. changes of position from sitting to standing or vice versa, the height of the display 106 will be adjusted automatically to match with the new height with minimum human intervention.

On the user side, the height of the user station 101 is naturally adjusted by the user 102 because the monitor in the user station 101 will be positioned to a comfortable viewing level by the user 102 if the user station 101 is in a form of a laptop or a desktop computer. It is even more convenience to match the height of the user station 101 to the user's eye level if the user station 101 is in a form of HMD.

Limited by the general configurations of camera and monitor as discussed in the previous section and affected by the parallax distortion accumulated from all the optical apparatus in the system, the gaze direction of the face image displayed on the telepresence device 103 and on the user station 101 would need minor adjustments in order to preserve the intended gaze direction between the user 102 and the subject 104. It is, therefore, both the user station 101 and the telepresence device 103 are equipped with systems and other means in the art to assist 3D image mapping, eye tracking and gaze recognizing so as to make sure the gaze of their eyes matches when necessary.

It is evident that the system 100 should not attempt to match the eye gaze between the user 102 and the subject 104 when one of them has no intention to make eye contact with the other one. For example, it is natural and preferable to maintain eye contact when the two are talking to each other. However, one may occasionally look elsewhere for a short period of time during the meeting, such as when one is thinking, writing or reading, or when no one is talking temporarily etc. In these circumstances, the telepresence system 100 will not perform any action to match the eye gaze when the gaze falls far away from the eyes of the image in the display but will preserve the gaze intention and all other facial expressions the user 102 and the subject 104. Once the gaze falls back into a reasonable range of area around the eyes of the image that signifies an intended eye contact, the system 101 will activate a gaze matching algorithm to resemble an eye contact between the user 102 and the subject 104 while preserving all other facial expressions. Therefore, in one embodiment, the system 101 is configured to activate the gaze matching algorithm by one or several pre-defined indicators such as a means of audio gain, gesture or gaze location etc. In another words, gaze matching system will be activated when the user 102 or the subject 104 is talking (audio gain indicator), or when one is gazing close to the eyes of the image (gaze location indicator), or when one is waving his hand (gesture indicator) etc.

When the user 102 and the subject 104 intend to maintain eye contact, their gaze points are already close to the eye area of the images in the display. Slight adjustments are only needed to match the gaze between the user 102 and the subject 104 to resemble an eye contact while preserving all other facial expressions. These slight adjustments can be achieved by executing the gaze matching algorithm, comprising of five computer controlled actions that may be taken either singularly or in combination, which are: fine adjustment of the telepresence device 103 position; translating, titling or rotating the telepresence device display 106; translating, tilting or rotating the cameras 203 and sensors 201 in the telepresence device, translating horizontally or vertically the image displayed in the telepresence device display 106; and recreating the face image. Details are exemplified below.

In a preferred embodiment of the user station 101, the camera is positioned on top of the monitor's center. Therefore, even if the user 102 is directly facing the monitor and the camera, and intends to maintain an eye contact by looking into the eyes of the subject's 104 image in the monitor, his gaze would appear to be looking down in the subject's perspective. In this case, the user's face image is recreated in order to preserve the true gaze of the user 102, i.e. keeping an eye contact with the subject 104. 3D real-time images captured by the user camera are processed by a pattern recognizing software that isolates the face image, tilts or rotates to the correct angle to make it look as if eye contact has been made with the subject 104 while preserving all other facial expressions. A border area around the face image may be extracted to blend the processed face image into its original background for an augmented reality experience. Instead of rendering the entire image that includes the background of the user 102, this method minimizes extensive computing power and is less prone to generating large gaps between images during a real-time image transmission. In case the camera loses sight of the user's face for a short moment, the last image is left as is until the user 102 or a new user's face image is captured by the camera and identified by the pattern recognizing software. Similarly, the subject's 104 face image is recreated from the 3D real-time images captured by the 3D camera 203 to account for the same configuration issue in the telepresence device 103, such that the subject's eyes will appear to be gazing directly towards the user 102 even the subject 104 is not looking directly into the camera 203. It is therefore, the gaze point of the subject 104 and the user 102 can be matched to resemble an eye contact while preserving all other facial expressions.

In another case, when the user 102 is not sitting or standing along the centerline of the camera but still within the field of view of the camera in the user station 101, the user 102 face may displayed off to one side when seen by the subject 104 in the display 106 of the telepresence device 103. To facilitate a natural conversation, it is necessary to reposition the off-center image regardless of the intention of eye contact between the user 102 and the subject 104. The real-time image of the user 102 captured by the 3D camera in the user station 101 is processed by the pattern recognizing software to isolate only the user's face image, which is then translated horizontally and/or vertically such that a full frontal face image of the user 102 that preserves the gaze intention and all other facial expression and is substantially centered in the telepresence device display 106 is displayed.

In another case, when the subject 104 changes the posture, e.g. from sitting to standing or from sitting straight to slouching in a chair, the telepresence device 103 will automatically adjust the height and position of the display 106 in response to the physical movement of the subject 104 by extending or retracting the length of the supporting components 107 based on the information received from the infrared sensors 201, which may be an infrared camera in this case, such that the eye level of the subject 104 matches exactly with the eye level of the user's image in the display 106. Such information is also used to control the mounting components 107 of the display 106 and the motorized arm 205 of the sensor hub 110 such that the display 106, camera 203 and sensors 201 are facing the subject 104 at their optimal angles to facilitate eye tracking and height tracking. In this case, because the camera 203 and the infrared sensors 201 are at their optimal spatial positions and the height of the telepresence device 103 matches with the subject 104, a full frontal face image of the subject 104 that preserves the gaze intention and all other facial expression and is substantially centered in the telepresence device display 106 is obtained.

In another case, when the subject 104 is moving around the site, the telepresence device 103 will automatically and instantaneously adjust its position such that it keeps a selected distance from the subject 104 while keeping the display 106 and the sensors hub 110 facing the subject 104 automatically. Information received from the 3D camera 203 and the infrared sensors 201, which may be a depth sensing camera in this case, are analysed by computer-implemented algorithms to control the direction, displacement and speed of the mobile platform 108. Assuming the height of the telepresence device matches exactly with the subject and the sensors and cameras are at their optimal spatial positions, a full frontal face image of the subject 104 that is substantially centered in the display of the user station 101 is captured.

It is essential to capture a real-time full frontal face image of the user 102 and the subject 104 because natural eye contact will occur when the gaze of one falls on the image of the other. More precisely, the gaze of the user 102 is intended to be on the eyes of the subject's image displayed in the monitor of the user station 101 and the gaze of the subject 104 is intended to be on the eyes of the user's image displayed in the display 106 of the telepresence device 103.

Figure 3:
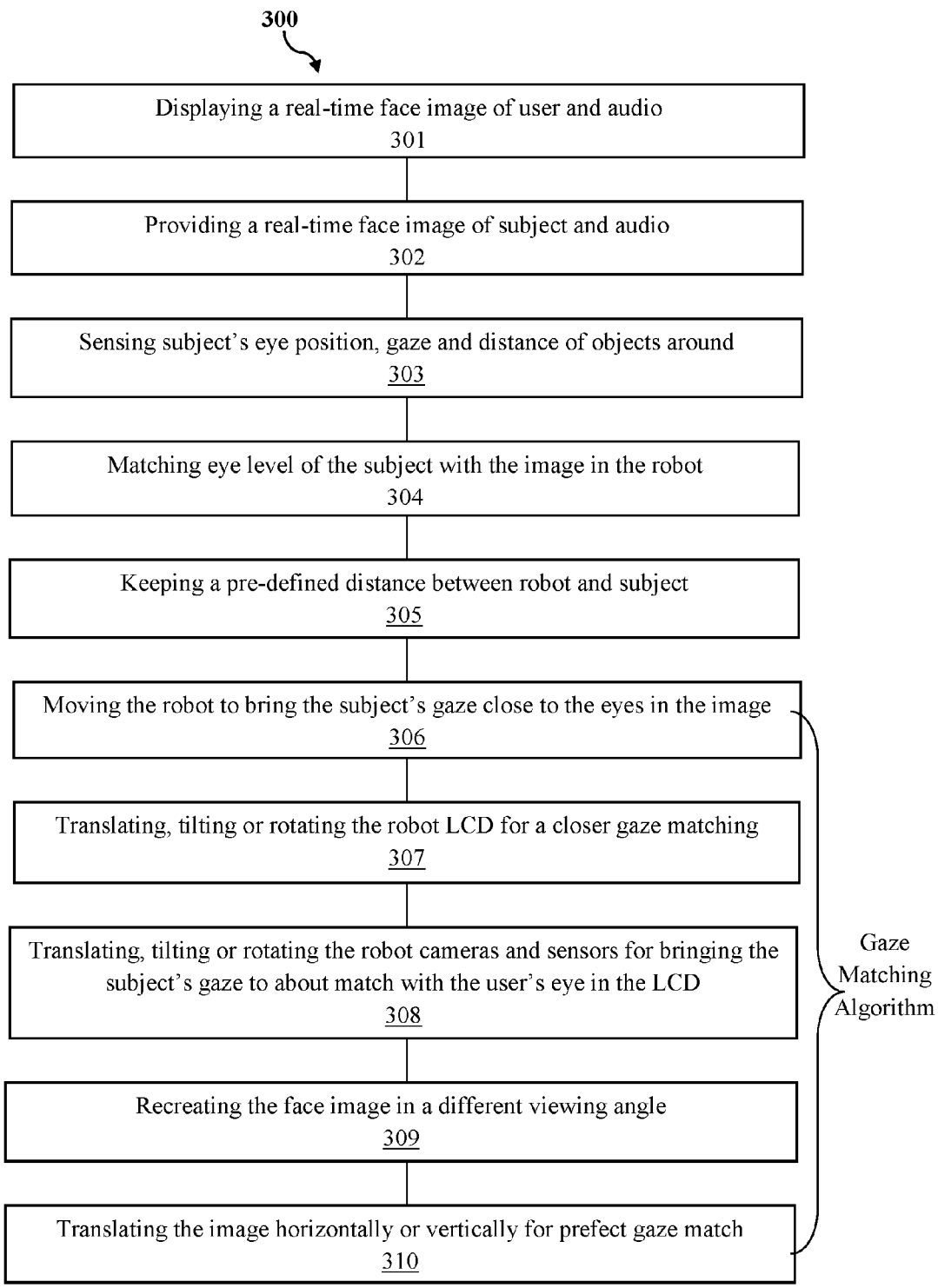
FIG. 3 is a method for telepresencing according to the present invention

Referring now to FIG. 3, therein is shown a block diagram illustrating a mode of operation 300 for telepresencing related to the present invention. By example and not by way of limitation, the sequence as shown in FIG. 3 could be in different order in accordance with the embodiment of the telepresence system. In one embodiment, the system first displays a real-time face image of the user along with audio captured by a camera and a microphone in the user station 301, and provides a real-time face image of the subject along with audio captured by a camera and a microphone in the telepresence device 302. Then, the subject's eye level, gaze direction and the distance of objects around are sensed continuously 303. The system then adjusts the height of the telepresence device display 106 such that the eye level of the subject matches with the eye level of the user image 304. Subsequently, it adjusts the position of the telepresence device to maintain a selected distance with the subject 305.

When the subject 104 looks directly into the eyes or towards the area around the eyes of the user's image in the telepresence device display 106, or vice versa, gaze matching will be performed by the control units in the user station 101 and the telepresence device 103. In case either the user 102 or the subject 104 shows no intension of eye contact, which can be a signal of voice, gesture or gaze direction etc., the telepresence system 100 will not attempt to match the eye gaze unless one or more of those pre-defined indicators are presented. It is, therefore, the gaze intention is preserved.

In circumstance where the system decided that there is a need to match the eye gaze between the user and the subject, the gaze matching algorithm consisting of steps 306 to 310 will be executed. To be specific, the telepresence device first adjusts its position slightly such that the subject's gaze is as close as possible to the eyes of the user's image 306. Then, the telepresence device display and/or, camera and/or sensors is translated, tilted or rotated to their optimum positions to bring the subject's gaze to about match with the user's eye in the display 307 and 308. Finally, if the gaze is still not perfectly matched, the real-time face image of the user or the subject is translated vertically and/or horizontally 309, or is recreated at a different viewing angle 310, or by a combination of both steps 309 and 310 processed by the control unit in the telepresence device and/or that in the user station.

While the invention has been presented with specific embodiments to monitor the height, recognize the facial features, match eye gaze and detect the distance between objects, it is to be understood that there are many alternatives in the art that are capable of obtaining the same information. These alternatives or variations will become apparent to those skilled in the art.

From the above disclosure, it would be obvious to those having ordinary skill in the art that the present invention is capable of simultaneously and automatically, with minimum human intervention, matching the height of the telepresence device with the subject, maintaining a selected distance between the telepresence device and the subject, recognizing gaze direction, preserving gaze intention and matching eye contact between the remote user and the subject.

The invention claimed is:

1. A telepresence system comprising a telepresence device and a user station for conducting video conferencing between a remote user at a first location and a local subject at a second location, wherein the user station is at the first location and the telepresence device is at the second location, the telepresence device comprising:
  a display unit having an adjustable height to display to the local subject a video image of the first location;
  a processing unit tracking characteristics of the remote user in the image displayed on the display unit, wherein the characteristics of the remote user identify an eye level of the remote user in the image displayed on the display unit;
  at least one sensor unit to sense characteristics of the local subject at the second location, wherein the characteristics of the local subject identify an eye level of the local subject; and
  a motorized support unit that automatically adjusts the height of the display unit to match the eye level of the remote user identified in the image displayed on the display unit with the identified eye level of the local subject.

2. The telepresence system as claimed in claim 1, wherein the motorized support unit automatically adjusts the height of the display unit to match the eye level of the remote user identified in the image displayed on the display unit with the identified eye level of the local subject in response to a change in the characteristics of the local subject identifying the eye level of the local subject.

3. The telepresence system as claimed in claim 1, wherein the display unit is translated automatically to orient the display unit toward the local subject in response to a physical movement of the local subject.

4. The telepresence system as claimed in claim 1, wherein the motorized support unit is adapted so that the display unit covers height-levels ranging from a seated short person to a standing tall person.

5. The telepresence system as claimed in claim 1, wherein
the sensed characteristics of the local subject identify eye positions of the local subject, and
a sensor hub that is translatable, tiltable or rotatable, or a combination thereof, comprises at least one sensor unit, wherein the sensor hub is electronically controlled to automatically be oriented toward the positions of the local subject.

6. The telepresence system as claimed in claim 1, wherein the user station comprises at least one sensor unit to perform 3D image mapping.

7. The telepresence system as claimed in claim 1, wherein the telepresence device further comprises:
at least one sensor unit to sense spatial characteristics of objects near either the local subject or the telepresence device at the second location;
a motorized mobile unit to move the telepresence device; and
a processing unit to control speed, displacement and direction of the motorized mobile unit, configured to maintain a selected distance between the telepresence device and the local subject, wherein the selected distance is based on the spatial characteristics of objects near either the local subject or the telepresence device.

8. The telepresence system as claimed in claim 7 wherein the motorized mobile unit is configured to maintain the selected distance between the telepresence device and the local subject in response to a change in position of the local subject.

9. The telepresence system as claimed in claim 7 wherein:
movements of the telepresence device at the second location are controlled by the remote user at the first location; and
the motorized mobile unit is configured to avoid potential obstacles when movements of the telepresence device are controlled by the remote user.

10. The telepresence system as claimed in claim 7, wherein
the sensed characteristics of the local subject identify eye positions of the local subject, and
a sensor hub that is translatable, tiltable or rotatable, or a combination thereof, comprises at least one sensor unit, wherein the sensor hub is electronically controlled to automatically be oriented toward the eye positions of the local subject.

11. The telepresence system as claimed in claim 1, wherein:
the sensed characteristics of the local subject identify eye positions of the local subject or gaze direction of the local subject, or both; and
the telepresence device further comprises a processing unit to identify a gaze point of the local subject; a processing unit to detect an intended eye contact between the remote user and the local subject; and a processing unit to execute a gaze matching system based on the sensed characteristics of the local subject and the tracked characteristics of the remote user in the image displayed on the display unit when an intended eye contact between the remote user and the local subject is detected.

12. The telepresence system as claimed in claim 11, wherein a sensor hub that is translatable, bitable or rotatable, or a combination thereof, comprises at least one sensor unit, wherein the sensor hub is electronically controlled to automatically be oriented toward the eye positions of the local subject.

13. The telepresence system as claimed in claim 11 wherein:
the tracked characteristics of the remote user in the image displayed on the display unit identify eye positions of the remote user in the image displayed on the display unit, and
the eye positions of the remote user identified in the image displayed on the display unit are substantially centered when no intention of eye contact between the remote user and the local subject is detected.

14. The telepresence system as claimed in claim 11 wherein:
the tracked characteristics of the remote use in the image displayed on the display unit identify eye positions of the remote user in the image displayed on the display unit, and
the eye positions of the remote user identified in the image displayed on the display unit are substantially centered when an intention of eye contact between the remote user and the local subject is detected.

15. The telepresence system as claimed in claim 11, wherein facial expressions of the remote user are preserved.

16. The telepresence system as claimed in claim 1, wherein the display unit is tilted automatically to orient the display unit toward the local subject in response to a physical movement of the local subject.

17. The telepresence system as claimed in claim 1, wherein the display unit is rotated automatically to orient the display unit toward the local subject in response to a physical movement of the local subject.

18. The telepresence system as claimed in claim 1, wherein the user station comprises at least one sensor unit to track eye positions of the remote user at the first location.

19. The telepresence system as claimed in claim 1, wherein the user station comprises at least one sensor unit to sense gaze direction of the remote user.

20. The telepresence system as claimed in claim 11, wherein:
the telepresence device further comprises at least one sensor unit to either sense audio gain characteristics or sense human gesture by the local subject, or both; and
the intended eye contact between the remote user and the local subject is detected based on either the sensed audio gain characteristics or on the sensed human gesture by the local subject, or on both.

* * * * *